(12) United States Patent
Domejean et al.

(10) Patent No.: US 7,656,640 B2
(45) Date of Patent: Feb. 2, 2010

(54) VOLTAGE SURGE PROTECTION DEVICE

(75) Inventors: Eric Domejean, Voreppe (FR); Joël Fagnoul, Waterloo (BE); Jean Baptiste Tallier, Brussels (BE); Alain Vandermotten, Brussels (BE)

(73) Assignee: Schneider Electric Industries SAS, Maimaison (FR)

( * ) Notice: Subject to any disclaimer, the term of this patent is extended or adjusted under 35 U.S.C. 154(b) by 306 days.

(21) Appl. No.: 11/148,175

(22) Filed: Jun. 9, 2005

(65) Prior Publication Data

US 2005/0280971 A1   Dec. 22, 2005

(30) Foreign Application Priority Data

Jun. 18, 2004  (FR)  ................................... 04 06657

(51) Int. Cl.
*H02H 1/00*  (2006.01)
(52) U.S. Cl. ................ 361/131; 361/111; 361/125
(58) Field of Classification Search ............. 361/111, 361/131, 125
See application file for complete search history.

(56) References Cited

U.S. PATENT DOCUMENTS

| 4,168,514 A | | 9/1979 | Howell ..................... 361/56 |
| 4,288,833 A | * | 9/1981 | Howell .................... 361/124 |
| 4,587,588 A | * | 5/1986 | Goldstein ................. 361/54 |
| 5,010,438 A | * | 4/1991 | Brady ...................... 361/56 |
| 5,153,806 A | * | 10/1992 | Corey ...................... 361/56 |
| 5,321,574 A | | 6/1994 | Patrick et al. ............. 361/99 |
| 5,412,526 A | * | 5/1995 | Kapp et al. ............... 361/56 |
| 5,933,310 A | * | 8/1999 | Eggendorfer ............. 361/104 |
| 6,020,802 A | * | 2/2000 | Larson et al. ............. 335/172 |
| 6,683,770 B1 | * | 1/2004 | Marsh ..................... 361/111 |
| 7,245,470 B2 | * | 7/2007 | Hoopes .................... 361/91.1 |
| 2002/0024792 A1 | * | 2/2002 | Cantagrel ................. 361/127 |
| 2008/0130180 A1 | * | 6/2008 | de Palma et al. .......... 361/56 |

FOREIGN PATENT DOCUMENTS

| EP | 0 046 545 | 3/1982 |
| FR | 2 545 999 | 11/1984 |
| FR | 2 846 478 | 4/2004 |

* cited by examiner

*Primary Examiner*—Ronald W Leja
*Assistant Examiner*—Christopher J Clark
(74) *Attorney, Agent, or Firm*—Stepoe & Johnson LLP

(57) ABSTRACT

The voltage surge protection device comprises at least one protection module designed to be connected to an electric switchgear apparatus. The protection module comprises at least one protective element for protection against voltage surges and separating means connected to at least one protective element to cause an electrical and/or mechanical separation representative of a fault of a protective element following an increase of temperature and/or electric current. The protection module comprises means for mechanical actuation connected to said separating means and comprising a mechanical control link. The electrical control link is placed in a tripped state representative of a fault of at least one protective element when said separating means have caused a separation.

19 Claims, 9 Drawing Sheets

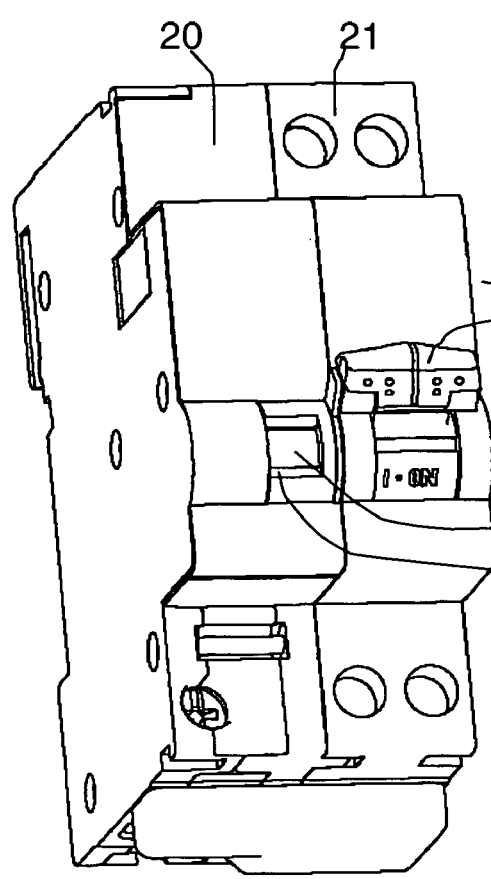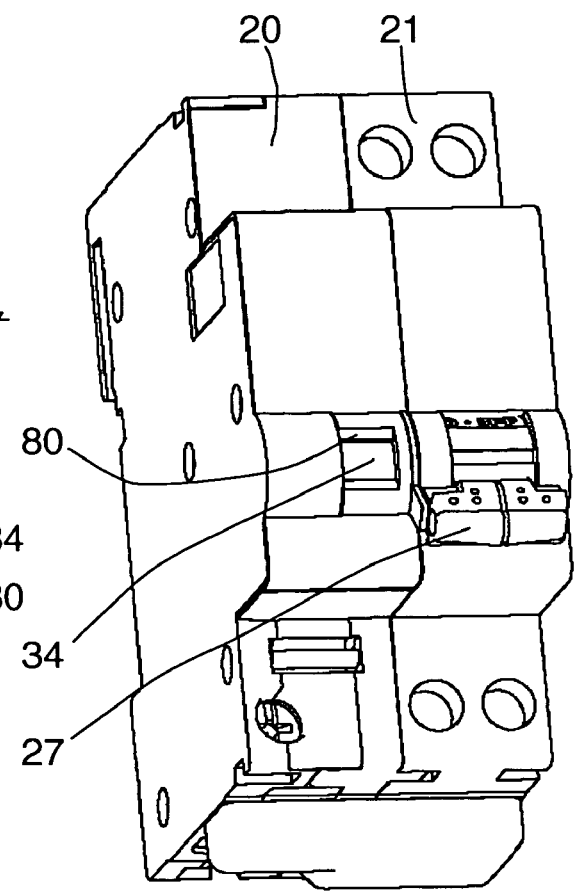
FIG. 15  FIG. 16
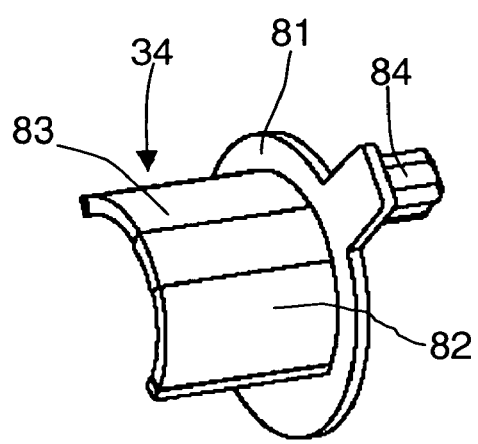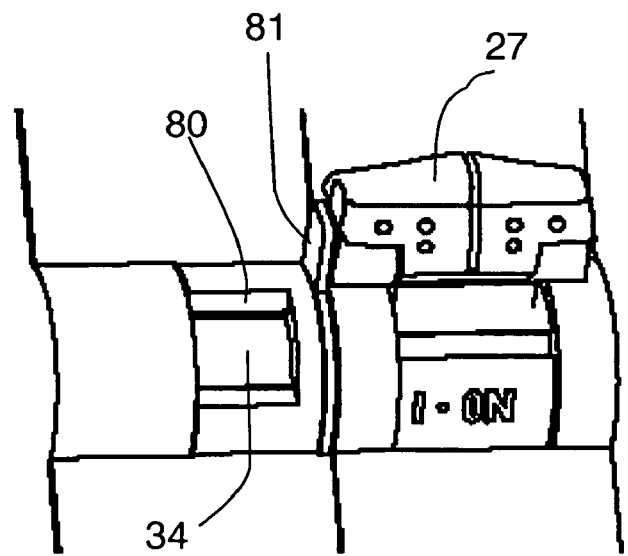
FIG. 17  FIG. 18

VOLTAGE SURGE PROTECTION DEVICE

BACKGROUND OF THE INVENTION

The invention relates to a voltage surge protection device comprising at least one protection module designed to be connected to an electric switchgear apparatus, said module comprising:
- at least one protective element for protection against voltage surges; and
- separating means connected to at least one protective element to cause an electrical and/or mechanical separation representative of a fault of a protective element following an increase of temperature and/or electric current.

STATE OF THE ART

Known voltage surge protection devices comprise at least one protective element for protection against voltage surges, in particular a voltage dependent resistor such as varistor or metal oxide varistor and a discharge tube such as gas tube or discharge tube. As represented in FIG. 1, a varistor 1 and/or a discharge tube 2 are generally arranged in a case 3. For example, in the case of a two-pole connection, the device comprises an input 4 to be connected to a neutral conductor N, an input 5 to be connected to a phase conductor P, and a terminal 6 for connection of an earth conductor 7. Generally speaking, the varistor is connected between a phase and neutral and the discharge tube is connected between the neutral and the earth conductor, but other types of connections or arrangements can be used. The varistor 1 is connected in series with a thermal fuse 8 to cause opening of the circuit when the varistor heats. Heating of the varistor can be generated by a leakage current following one or more electric impacts.

The thermal fuse 8 is sometimes insufficient to protect the protective elements 1 and 2. In FIG. 1, a circuit breaker 10 connected up-line from the terminals 4 and 5 performs electrical protection of the device.

Devices also exist achieved by a combination of a circuit breaker and protective elements. An example of a combination is represented in FIG. 2. The device comprises a case 11 with inputs 4 and 5 connected up-line to a power supply system 12 and outputs 14 and 15 to supply a load 16. Between the inputs and outputs, a circuit breaker comprises main contacts 17 in series with a thermal or magneto-thermal protective relay 18. In the same housing case, varistors 19 are connected between the outputs and an earth conductor 7. Such combinations are described in U.S. Pat. Nos. 4,168,514 and 5,321,574.

In state-of-the-art devices, when an electric fault causes tripping of a protective circuit breaker, a user can reset the device whereas voltage surge protection elements are defective.

Moreover, state-of-the-art devices based in particular on combinations of FIG. 2 protect the loads connected down-line from the circuit breakers. If the circuit breaker is tripped by a fault on the varistors, in particular by overheating or by short-circuit, the power supply to the load is no longer ensured. In such a case, there is a large risk of outage of the installation.

SUMMARY OF THE INVENTION

The object of the invention is to achieve a voltage surge protection device providing efficient protection against voltage surges, improved use and a large up-time of the electric power supply of an installation.

In a device according to the invention, the protection module comprises means for mechanical actuation connected to said separating means and comprising a mechanical control link, said mechanical control link being placed in a tripped state representative of a fault of at least one protective element when said separating means have caused a separation, said means for mechanical actuation being designed to be coupled to an electric switchgear apparatus by means of the mechanical link to actuate opening or tripping of said apparatus when said mechanical link is in a tripped state.

Advantageously, the means for mechanical actuation block the mechanical link in a tripped state when said separating means have caused a separation.

Preferably, at least one protective element is at least one varistor in thermal connection with a thermal pin of the separating means, said pin being connected to the means for mechanical actuation to place the mechanical link in a tripped state following melting of said pin caused by heating of said varistor.

Preferably, at least one protective element is at least a discharge tube in electrical connection with an electrical fuse of the separating means, said fuse being connected to the means for mechanical actuation to place the mechanical link in a tripped state following melting of said fuse caused by an increase of the current in said discharge tube.

Advantageously, the means for mechanical actuation comprise centralizing means for centralizing mechanical actions caused by links with thermal pins or fuses of the separating means.

In a preferred embodiment, the means for mechanical actuation comprise:
- at least one lever connected on the one hand to the separating means and on the other hand to the mechanical link, and
- at least one return spring connected to said lever and to a case of the protection module to return said lever to a fault position when an element of the separating means releases the lever following a mechanical separation due to thermal or electrical stresses;

said mechanical link being actuated and kept in a tripped state by the lever when it is in a fault position.

According to an alternative embodiment, the separating means comprise at least a combination of an electric fuse element and a thermal pin, mechanical separation of the electric fuse element or of the thermal pin being able to cause actuation of the means for mechanical actuation.

Preferably, the separating means comprise at least one thermal pin made of metal alloy or of thermofusible plastic material, melting or fusing of the pin causing a mechanical separation acting on the means for mechanical actuation.

In a particular embodiment, at least one protection module comprises separating means with an electric fuse element composed of a metal blade positioned in arc distribution fins.

Preferably, at least one protection module comprises mechanical display means for displaying the operating state of the protection device, said display means comprising a mechanical link designed to be coupled with an operating member of an electric switchgear apparatus.

According to a first alternative embodiment, at least one protection module comprises mechanical means for displaying the operating state of the protection device actuated by the mechanical control link.

According to a second alternative embodiment, at least one protection module comprises mechanical means for local display actuated by the means for mechanical actuation to indicate the state of the separating means of at least two protective elements in differentiated manner.

In a preferred embodiment, the protection device comprises an electric switchgear apparatus in conjunction with said protection module, said apparatus comprising inputs designed to be connected to a line to be protected, main contacts controlled by a trip mechanism, and outputs, said at least one protective element against voltage surges being connected to the outputs of the switchgear apparatus and the mechanical control link being connected to the trip means to actuate opening and/or to block closing of the main contacts of the electric switchgear apparatus when said mechanical link is in a tripped state representative of a fault of at least one protective element.

Advantageously, said protection module comprises mechanical means for displaying the operating state mechanically linked to an operating handle of the electric switchgear apparatus.

In a particular embodiment, the device comprises a second additional protection module comprising second means for mechanical actuation and a second mechanical control link to act on tripping of the switchgear apparatus, the second mechanical link acting on the trip mechanism of the switchgear apparatus via a first mechanical link of a first protection module. In this case, the electric switchgear apparatus is a four-pole switchgear apparatus, outputs of a first and second pole receiving connection of protective elements of said first protection module and outputs of a third and fourth pole receiving connection of protective elements of said second additional protection module.

Advantageously, the device comprises an auxiliary electric device associated with a protection module to receive actions or to actuate a mechanical tripping link.

According to a first alternative embodiment, the switchgear apparatus and the protection module are modular and coupled via a lateral side.

According to a second alternative embodiment, the switchgear apparatus is a molded case circuit breaker and the protection module is mounted on output terminals down-line from said circuit breaker, said trip means designed to receive an action from the mechanical link being situated on a down-line side of said circuit breaker.

BRIEF DESCRIPTION OF THE DRAWINGS

Other advantages and features will become more clearly apparent from the following description of particular embodiments of the invention, given as non-restrictive examples only, and represented in the accompanying drawings in which:

FIGS. 15 and 16 represent global views of devices according to embodiments of the invention;

FIGS. 17 and 18 represent partial views of a mechanical indicator of a device according to the invention;

DETAILED DESCRIPTION OF PREFERRED EMBODIMENTS

Figure 1:
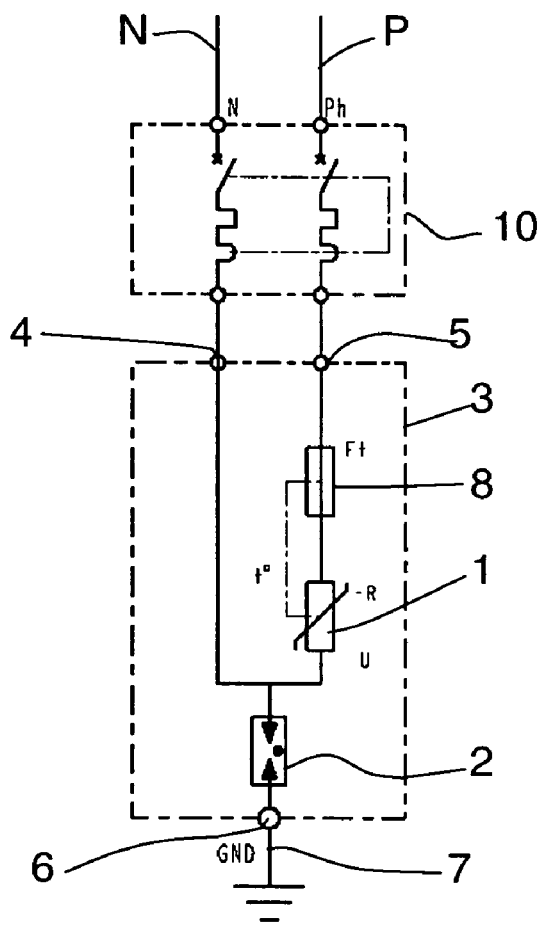
FIGS. 1 and 2 represent diagrams of state-of-the-art devices.
Figure 2:
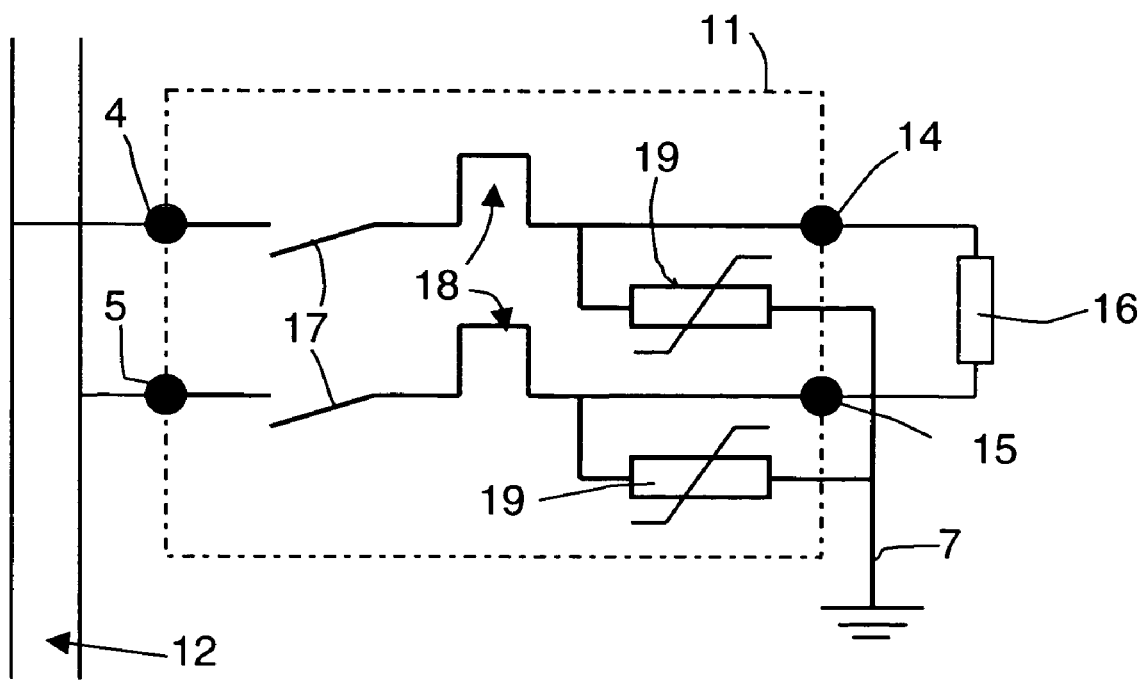
Figure 3:
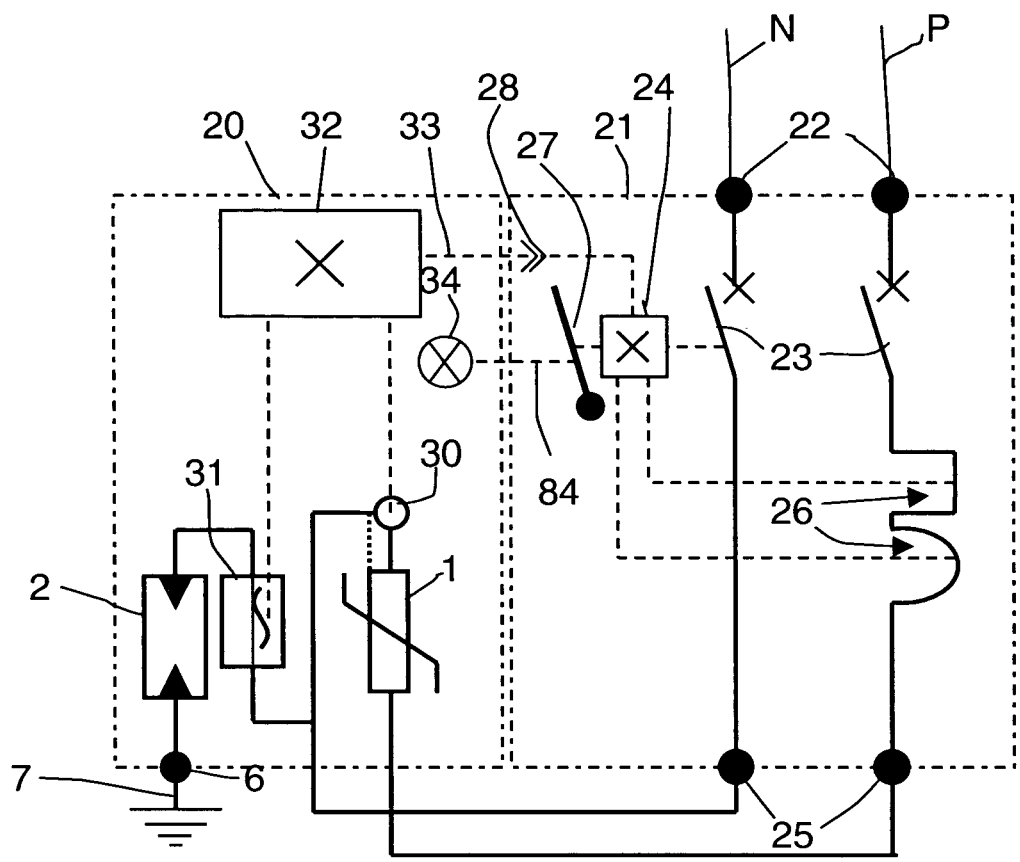
FIG. 3 represents a block diagram of a protection device according to an embodiment of the invention.

A voltage surge protection device, represented in FIG. 3, comprises a protection module 20 designed to be connected to an electric switchgear apparatus 21 such as a circuit breaker. The switchgear apparatus comprises inputs 22 designed to be connected to a line of a power supply system to be protected, main contacts 23 controlled by a trip mechanism 24, and outputs 25 connected to the main contacts by means of a trip relay 26. The trip relay arranged on one or more poles actuates the trip mechanism if an electric fault is detected, in particular an overload fault or a short-circuit fault. An operating device 27 such as a handle enables the contacts 23 to be closed or opened via the trip mechanism 24. Said trip mechanism can be connected with the outside of the apparatus by a coupling member 28. The coupling member is commonly called the trip bar.

The protection module comprises at least one protective element for protection against voltage surges, in particular a varistor 1 and/or a discharge tube 2 designed to be connected to the outputs 25. Said module also comprises separating means connected to a protective element to cause electrical separation of said protective element following a temperature and/or electric current increase. In the diagram of FIG. 3, the separating means are a thermal pin 30 thermally connected to the varistor 1 and an electric fuse 31 connected in series with the discharge tube 2.

In one embodiment of the invention, the protection module comprises a mechanical actuator 32 connected to said separating means to place a mechanical control link 33 in a tripped state representative of a fault of at least one protective element 1 or 2 when said separating means 30 or 31 have caused a separation. The mechanical actuator 32 is designed to be coupled to an electric switchgear apparatus and to actuate opening or tripping of said apparatus when said mechanical link 33 is in a tripped state.

Thus, when the module 20 is coupled with a circuit breaker 21 as in FIG. 3, the mechanical link 33 can act on the trip mechanism 27. The varistor 1 and discharge tube 2 are connected to the outputs 25 of the circuit breaker. The assembly thus formed protects a line of a power supply system connected to the inputs 22 when the circuit breaker contacts 23 are closed. If a thermal fault on the varistor 1 causes a deterioration of the thermal pin 30, the mechanical actuator connected to the pin 30 places the mechanical link in a tripped state which acts on the circuit breaker trip mechanism 24 to open the contacts 23 and stop connecting the protective elements 1 and 2. An electric fault on the discharge tube can cause the fuse 31 to melt. In this case, the mechanical actuator connected to the fuse 31 also places the mechanical link in a tripped state which acts on the circuit breaker trip mechanism 24. The mechanical actuator thus centralizes mechanical connection movements with different pins or fuses of the separating means.

The mechanical actuator is then in an irreversible state which prevents resetting or closing of the circuit breaker by keeping the mechanical link 33 blocked in a tripped state. Non-closing of the circuit breaker on a fault element ensures a high safety even if one of the faulty elements is disconnected by a separating device. In addition, should closing or tripping on closing be impossible, the state of the circuit breaker is representative of the availability of the voltage surge protection device and representative of a fault of at least one protective element. In all cases, the availability of the electric power distribution of the installation is preserved even if a protective element is faulty.

To improve the visibility of the state of the protection device, the module 20 comprises a mechanical indicator designed to be associated with the operating member of the switchgear apparatus, for example the circuit breaker handle.

Figure 4:
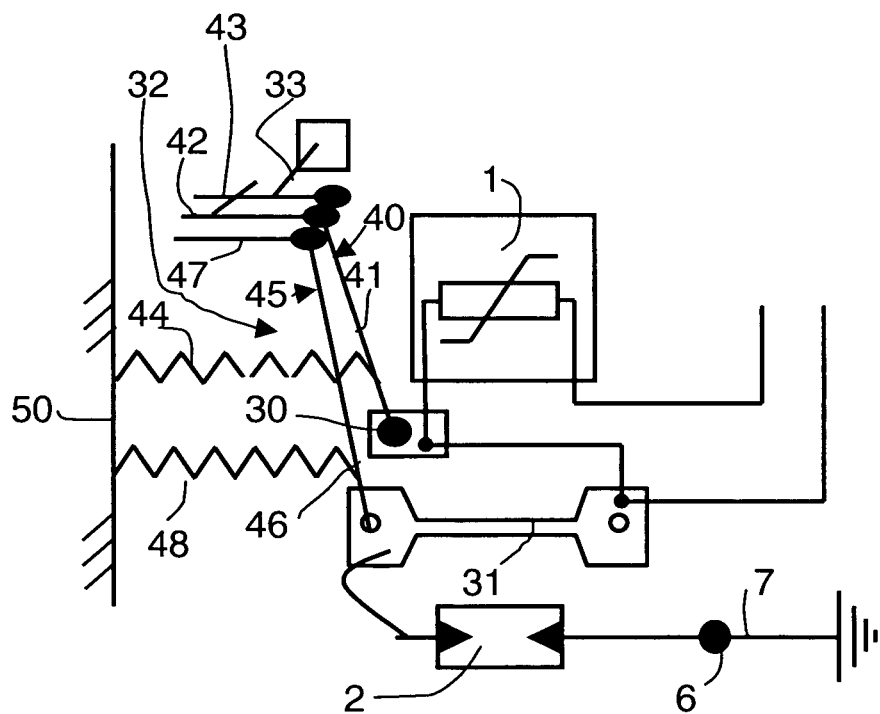
FIGS. 4 to 6 represent mechanical diagrams of operation of a device according to an embodiment of the invention.

FIG. 4 shows a mechanical diagram of a module. The mechanical actuator comprises a first lever 40 with a first arm 41 mechanically connected to a pin 30 and a second arm 42 acting on a control centralizer 43 and to the mechanical link 33. A first return spring 44 is connected to the first arm of the first lever and to a case 50 to return said lever to a fault position when the pin releases the lever following a mechanical separation due to thermal stresses. For example, if the pin melts or deteriorates causing a break, the lever 40 is urged towards the case 50 by the spring 44. A second lever 45 comprises a first arm 46 connected to the fuse 31 and a second arm 47 acting on the control centralizer 43. A second return spring 48 is connected to the first arm 46 of the second lever and to the case 50 to return said second lever to a fault position when the fuse releases the lever 45 following a mechanical separation due to electric stresses in particular a short-circuit. For example, if the fuse melts or is sectioned, the lever is biased in the direction of the case by the spring 48.

Figure 5:
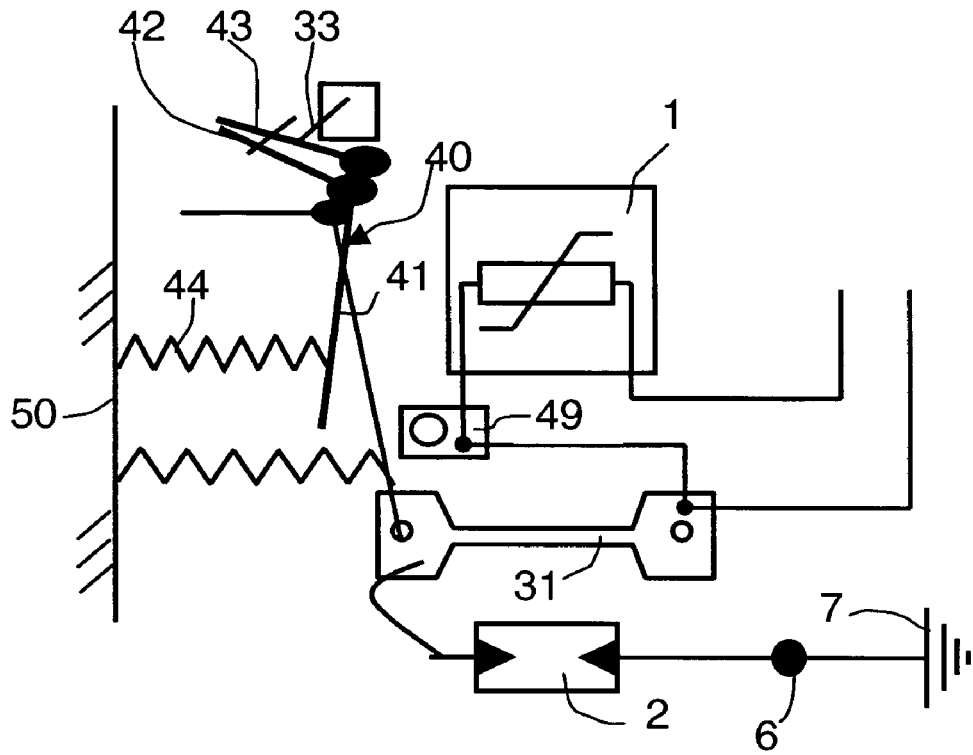

FIG. 5 shows a mechanical diagram according to FIG. 4 in which the pin 30 has melted. The pin 30 initially located on a strip 49 in thermal connection with the varistor 1 has released the lever 40. The spring 44 attracts the arm 41 towards the case. The arm 42 then acts on the centralizer 43 and keeps the link 33 in the tripped position. The arm 41 biased by the spring 44 cannot return to the initial position. The pin is preferably thermal made of metal alloy or thermo-fusible plastic material with a low melting temperature.

Figure 6:
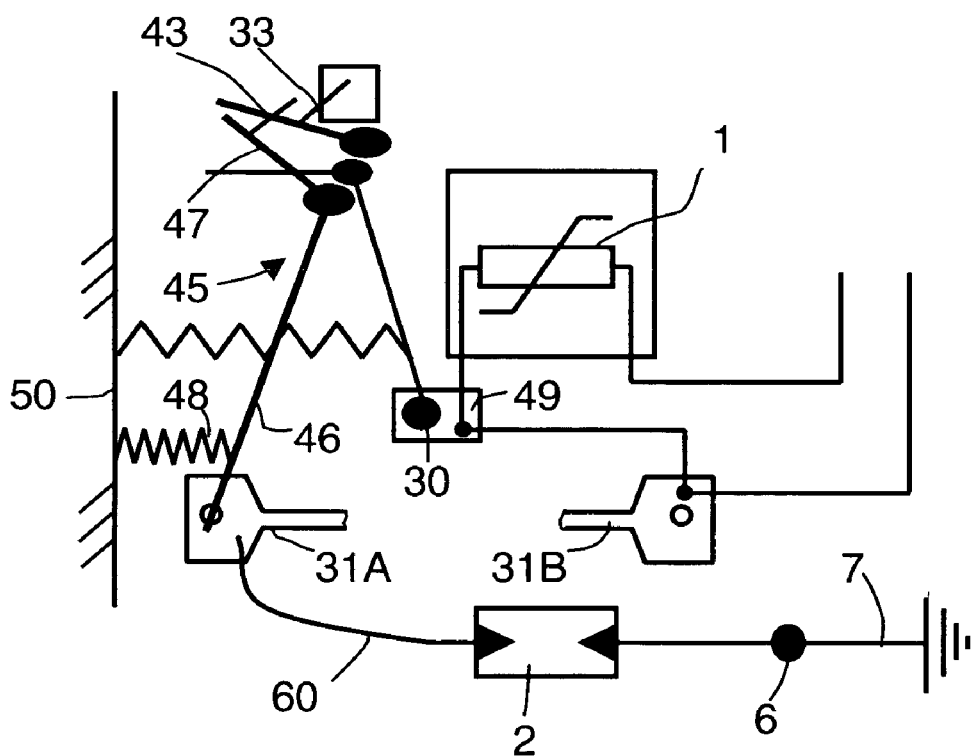

FIG. 6 shows a mechanical diagram according to FIG. 4 in which the fuse 31 has melted. Sectioning of the fuse 31 into two parts 31A and 31B opens the electric connection with the discharge tube 2 and releases the lever 45. The spring 48 attracts the arm 46 towards the case 50. The arm 47 then acts on the centralizer 43 and keeps the link 33 in the tripped position. The arm 46 biased by the spring 44 cannot return to the initial position. To enable easy movement of the lever 46, an electric connection 60 between the discharge tube and the fuse is preferably flexible, for example made of braided electric wire.

Figure 7:
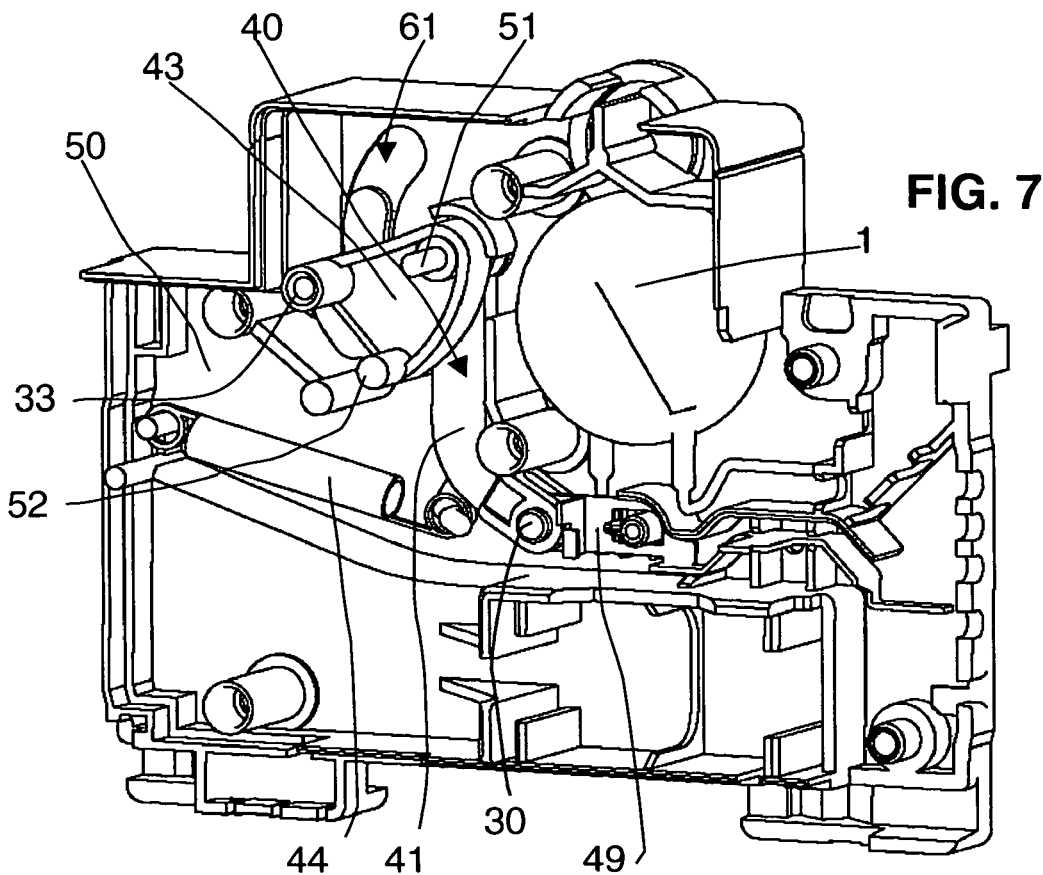
FIGS. 7 and 8 represent internal views of a device according to an embodiment of the invention.
Figure 8:
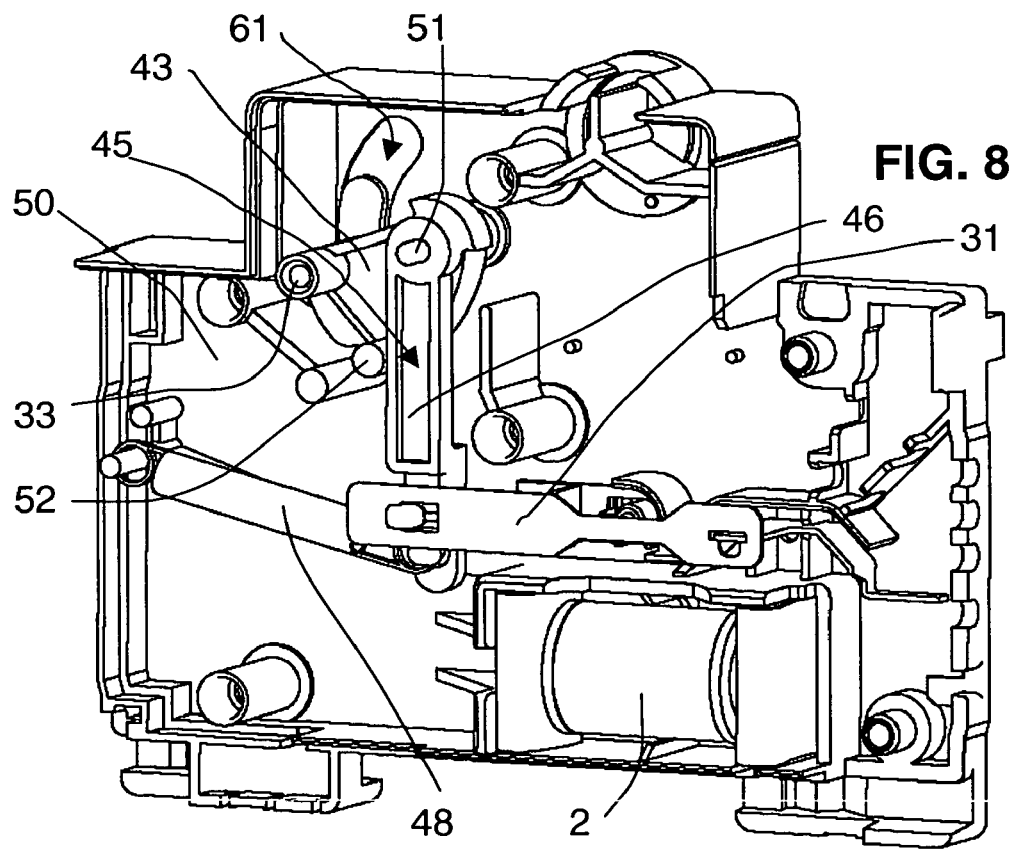

FIGS. 7 and 8 represent internal views of a device according to another embodiment of the invention. The levers 40 and 45 each comprise a single arm respectively 41 and 45 pivoting around the same spindle 51. The centralizer 43 pivots on the same spindle 51 as the levers 40 and 45 and comprises studs to receive the movement caused by the levers. The mechanical link 33 moves in an opening 61 of the case 50. In FIG. 7, an internal view shows an arrangement of the elements involved in tripping by the varistor. A connection output of the varistor is connected to a metal strip 49 which holds the pin 30. This electric connection between metal parts also enables a heat transfer to take place between the varistor 1 and pin 30. The lever 40 with a single arm 41 acts on a stud 52 of the centralizer 43 when a spring 44 attracts said lever 40 to a tripped position following breaking or melting of the pin 30. In FIG. 8, an internal view shows an arrangement of the elements involved in tripping by the discharge tube 2. The lever 45 with a single arm 46 acts on a stud 52 of the centralizer 43 when a spring 48 attracts the lever to a tripped position following melting or sectioning of the fuse 1.

Figure 9:
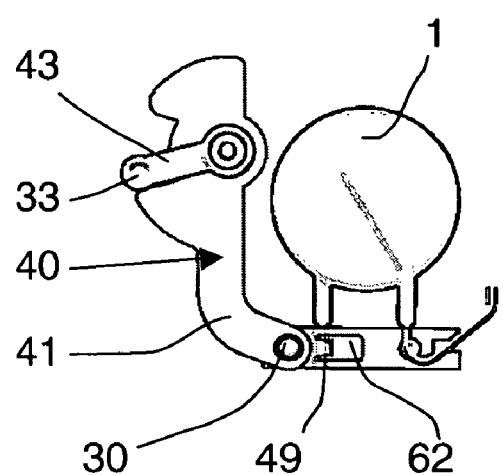
FIGS. 9 to 12 represent alternative embodiments of mechanical parts of devices according to embodiments of the invention.
Figure 10:
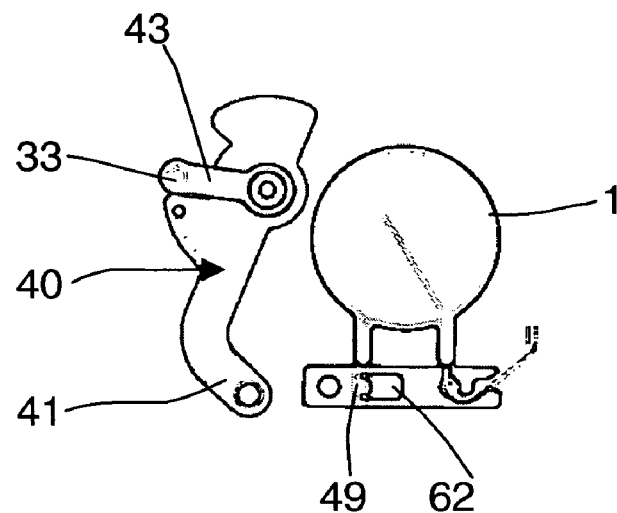
Figure 11:
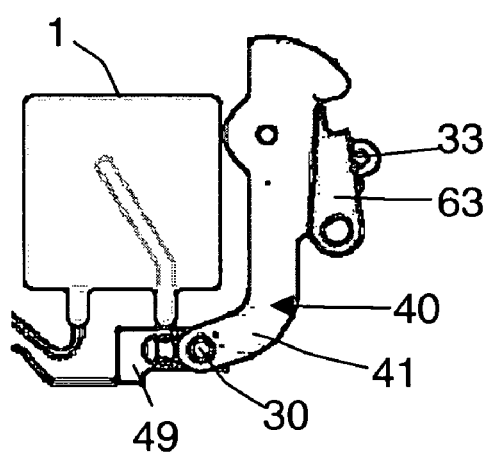
Figure 12:
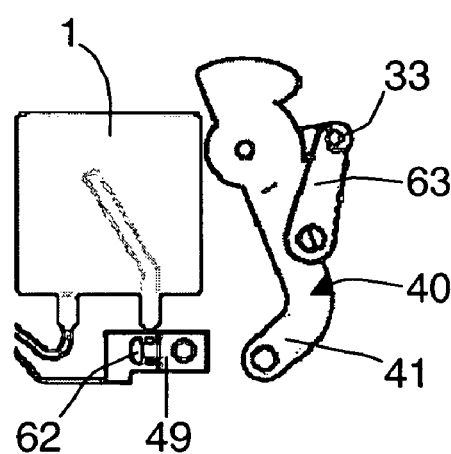

FIGS. 9 to 12 represent alternative versions of mechanical parts of devices according to embodiments of the invention in the operating position and in the tripped position. In FIGS. 9 and 10 the lever 40 swivels on the same spindle as the centralizer and is in the shape of a cam which acts at the end of said centralizer on the mechanical link 33. The strip 49 holding the pin 30 comprises an opening 62 acting as thermal brake. In FIGS. 11 and 12, the centralizer 43 and mechanical link 33 are locked in a tripped position by a latch 63.

Figure 13:
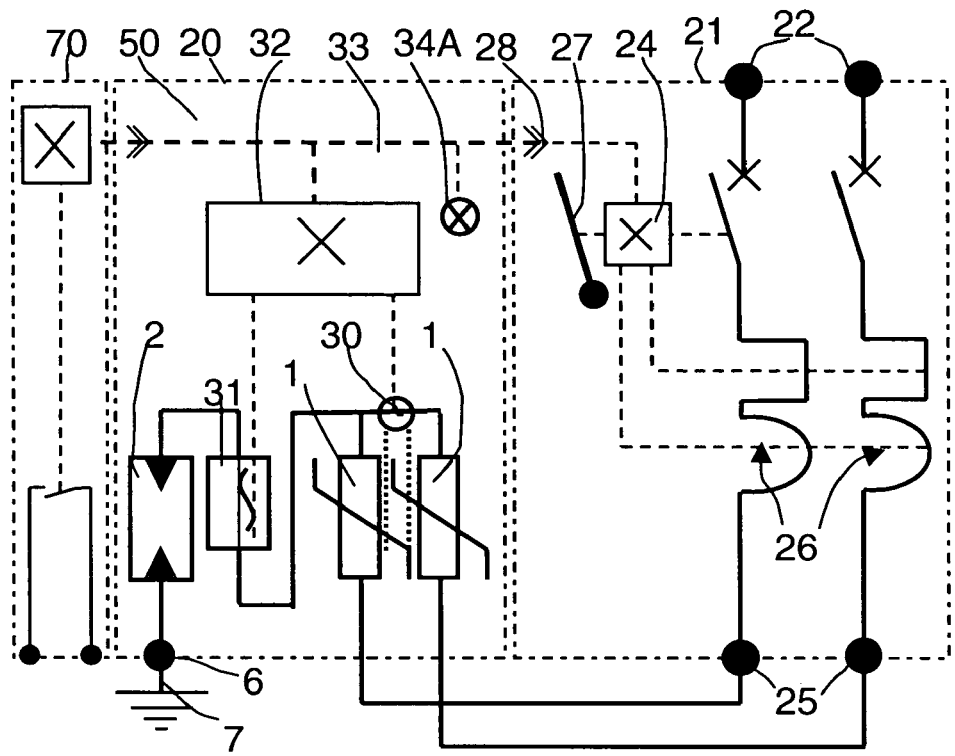
FIG. 13 represents a device according to an embodiment of the invention with two protected poles.

FIG. 13 shows a diagram of a voltage surge protection device where a protection module 20 comprises a discharge tube 2 and two varistors 1. In this two-pole configuration the varistors are connected to the outputs 25 of the circuit breaker 21 where the two poles are protected by the relay 26. A common point between the varistors is connected to the discharge tube by means of the fuse 31. To limit the number of components in the case, the module 20 comprises a thermal pin 30 in thermal connection with the two varistors 1. The protection module 20 comprises a mechanical link 33 able to act on the circuit breaker 21 on a first side of its case 50 and on an auxiliary circuit module 70 on another side of its case 50. Thus, the mechanical link 33 can transmit mechanical movements from one side of the protection module 20 to the other and enable stacking of modules. The auxiliary circuit module 70 can be an output module receiving actions from the mechanical link, for example to provide a contact representative of the state of the circuit breaker and consequently of the availability of the protection device as in FIG. 13, or an input module able to receive commands to actuate the circuit breaker, for example a shunt coil or an undervoltage coil. In this embodiment, a local mechanical indicator 34A is connected to the mechanical link 33 of the actuating means 32 of the protection module 20.

Figure 14:
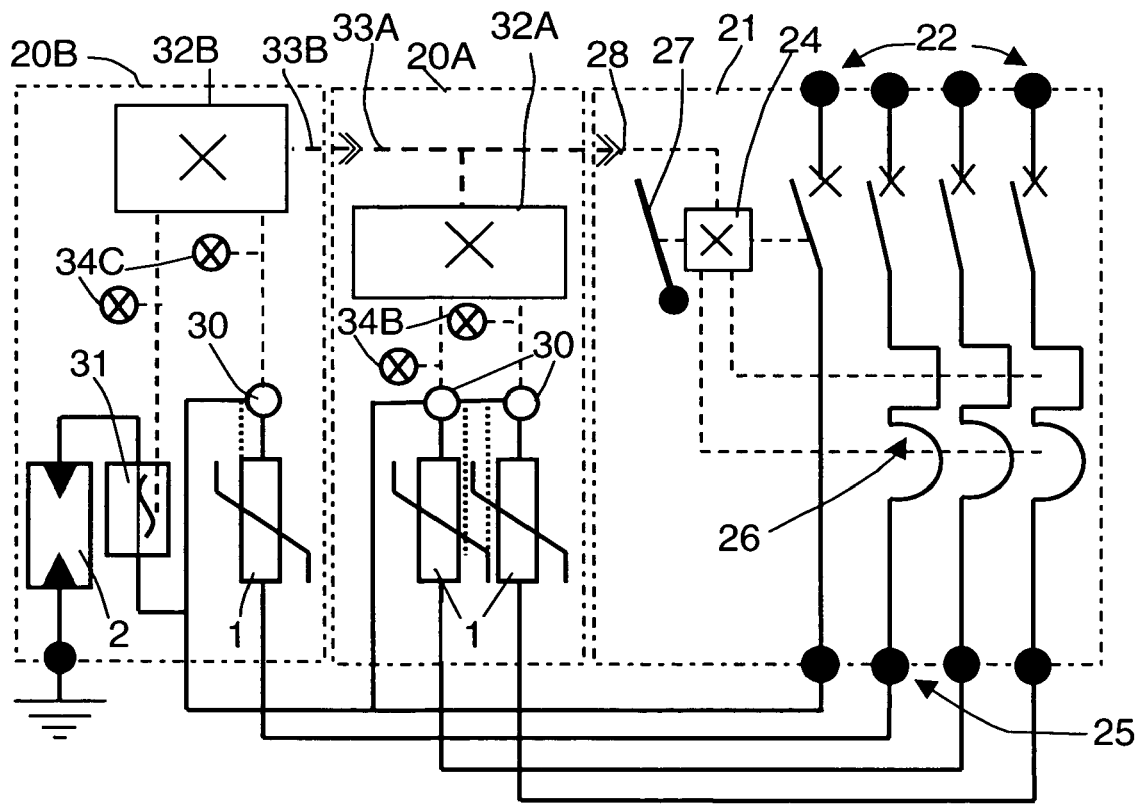
FIG. 14 represents a device according to an embodiment of the invention with an additional module.

FIG. 14 shows a voltage surge protection device comprising two protection modules 20A and 20B in association with a four-pole circuit breaker. A first protection module 20A comprises two varistors 1 and two thermal pins to act on a first actuating mechanism 32A. A first mechanical link 33A is associated with the circuit breaker coupling member 28 on a first side and receives a second mechanical link 33B of another additional module 20B on a second side. The second additional module 20B is like the one described in FIG. 3—it comprises a varistor 1 and a discharge tube 2 respectively associated with a thermal pin 30 and a fuse 31 to actuate an actuating mechanism 32B of a second mechanical link 33B. In this case, the second mechanical link 33B acts on the circuit breaker via a first mechanical link 33A of the module 20A. The electric switchgear apparatus is a four-pole circuit breaker, outputs of a first and second pole receiving connection of protective elements of the first protection module 20A and outputs of a third and fourth pole receiving connection of protective elements against voltage surges of the additional protection module 20B. In this figure, the modules 20A and 20B can comprise local mechanical indicators 34B, 34C to display the state of each protective element in differentiated manner. If the actuating mechanisms 34B and/or 34C comprise levers, the local mechanical indicators can be associated with each lever to indicate breaking of a pin or of a fuse.

FIGS. 15 and 16 show global views of a protection device comprising a protection module 20 and an associated circuit breaker 21. The circuit breaker handle 27 can serve the purpose of indicating the operating state of the protection function. However, to improve this indication, a mechanical indicator flag 34 is arranged on the protection module and mechanically connected to the handle 27 when the module is assembled with the circuit breaker. In FIG. 15, voltage surge protection is active, the circuit breaker is closed, the handle is in a first raised position, and the indicator flag displays a first colour in a window 80 of the module 20. In FIG. 16, voltage surge protection is inactive, the circuit breaker is open, the handle is in a second lowered position and the indicator flag displays a second colour in the window 80. The second open position can be caused by a fault in a protective element. In this case, closing can not be activated.

FIGS. 17 and 18 show partial views of the mechanical indicator flag 34 and its association with the handle 27. In FIG. 17, the indicator comprises a circular support 81 with a first display zone 82 of a first colour and a second display zone 83 of a second colour. A stud 84 salient from the support 81 is designed to be inserted in a lateral hole of the handle 27. In FIG. 18, the indicator flag 34 and handle 27 are associated by means of the stud 84.

In other embodiments, the switchgear apparatus can comprise an external locking device to prevent manual closing or opening by means of the handle. The open or closed position of the handle is representative of the state of availability of the voltage surge protection device.

Figure 19:
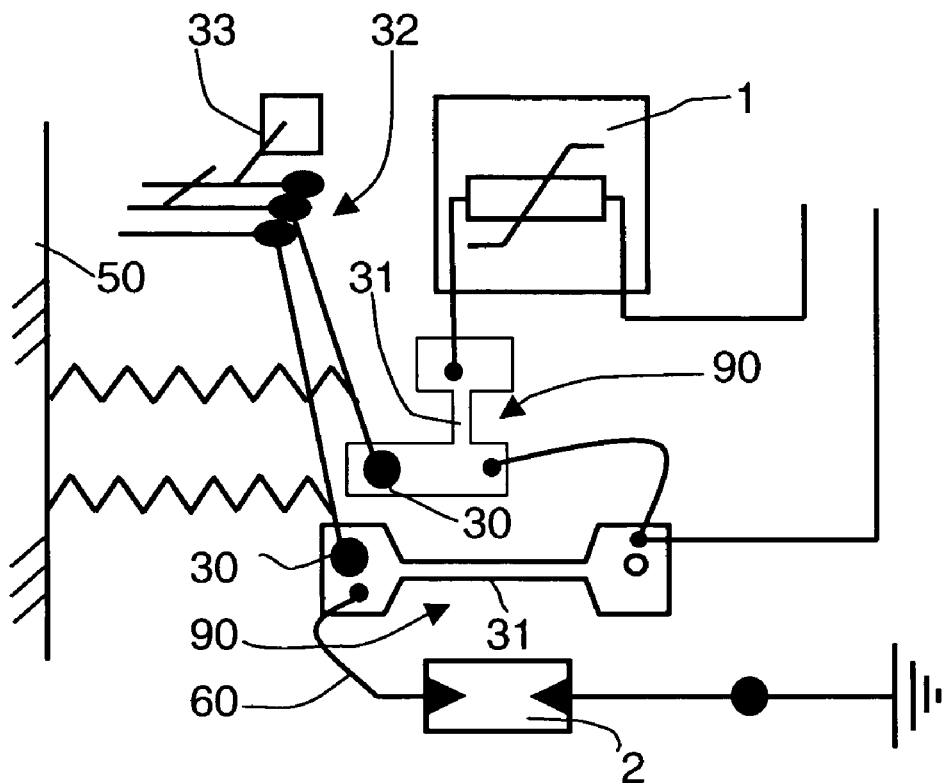
FIG. 19 represents a diagram of an alternative embodiment of a device according to the invention with thermal and electric protections on the varistor and discharge tube.

FIG. 19 shows an embodiment where the separating means of the varistor 1 and of the discharge tube 2 comprise a combination 90 of an electric fuse 31 and a thermal pin 30, mechanical separation of the electric fuse or thermal pin being able to cause the means for mechanical actuation to be actuated.

Figure 20:
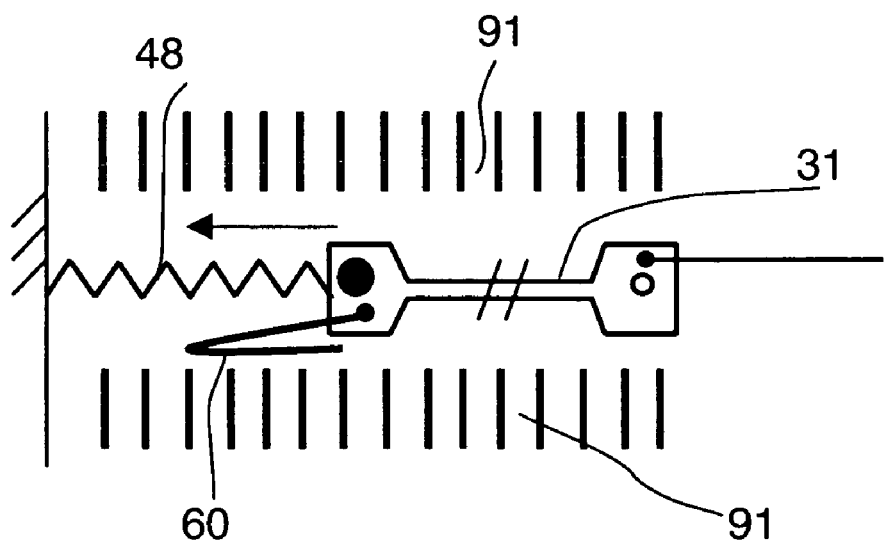
FIG. 20 represents a diagram of an alternative embodiment of a device according to the invention with an electric arc distributor on an electric fuse.

In FIG. 20, the protection module comprises a fuse 31 for protection of the discharge tube composed of a metal blade positioned in electric arc distribution fins.

The return springs 44 and 48 are represented in the figures with traction effects on the levers. However, other spring arrangements are possible, for example springs arranged to act in compression, leaf springs or coil springs.

Figure 21:
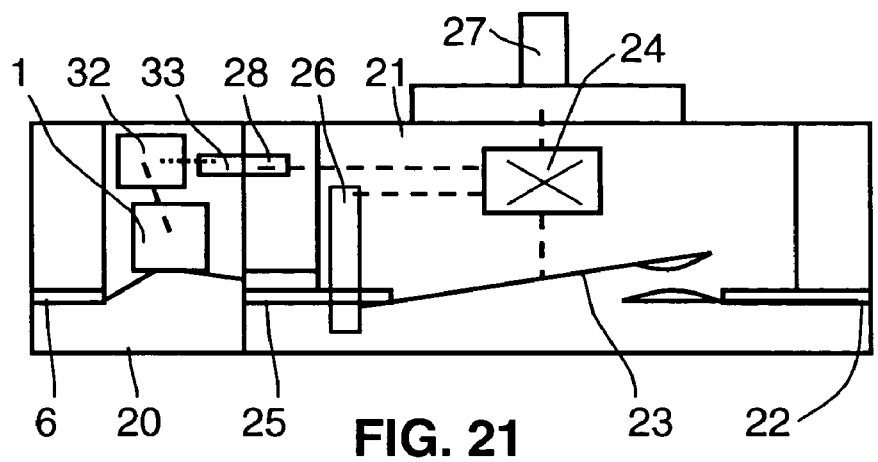
FIGS. 21 to 24 represent alternative embodiments of a device according to the invention applied to molded case circuit breakers for high power.
Figure 22:
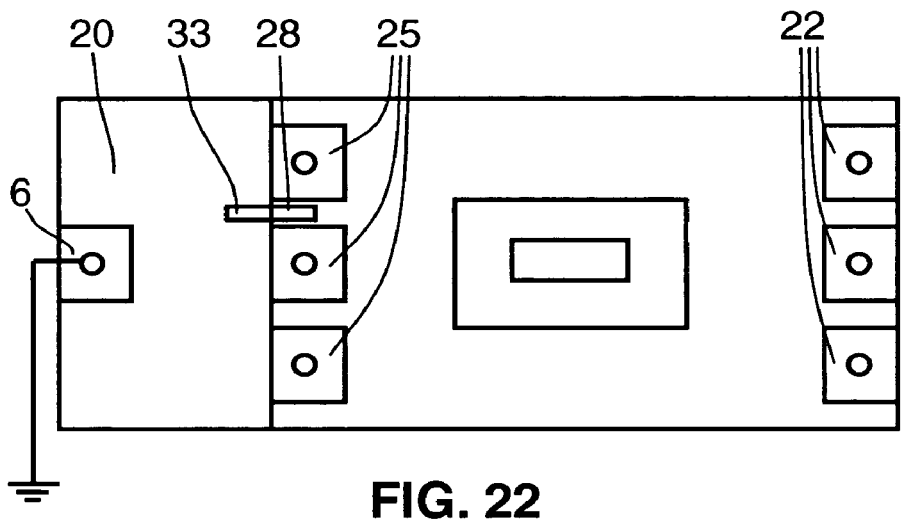
Figure 23:
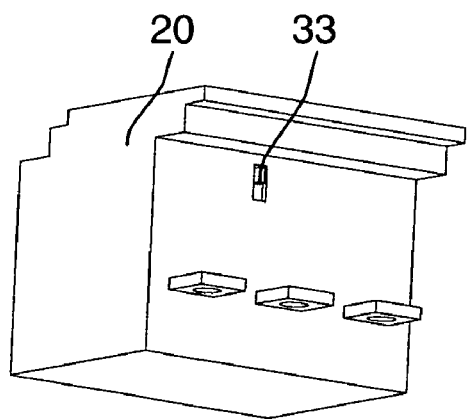
Figure 24:
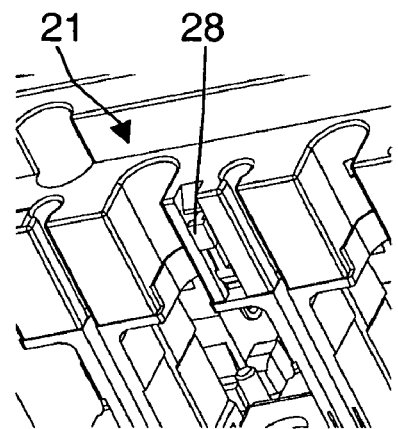

For high powers, the switching apparatus 21 can be a molded case circuit breaker comprising a trip member 28 by auxiliary circuits arranged down-line. Thus, in FIGS. 21 and 22, the voltage surge protection device 20 is arranged down-line from the molded case circuit breaker 21. The connection terminals 25 down-line from the circuit breaker receive the protection device 20 as an auxiliary circuit presenting a mechanical tripping link 33. The inside of the protection device 20 comprises features similar to those described in FIGS. 3 to 20. FIG. 23 shows an external view of a protection module with a mechanical link 33 and able to be associated with a molded case circuit breaker 21. FIG. 24 shows a detailed view of a trip member 28 of a molded case circuit breaker able to receive a protection device 20 of FIG. 23.

The protective elements are preferably metal oxide varistors such as zinc oxide varistors or voltage surge arresters with gas cartridges, gas tube, discharge tube or air discharge spark gaps. However other voltage surge protection elements can be used, for example varistors made from other materials, semi-conducting components such as avalanche or reverse biased diodes, or combinations of several components to limit an electric voltage.

The voltage surge protection device is preferably achieved in the form of a modular apparatus able to be easily assembled and associated. However, it can also be achieved in other forms.

The switchgear apparatus is preferably a circuit breaker comprising an overload protection and/or a short-circuit protection. For example, the rating of the protections can be adjusted or chosen according to the capacitances of the protective elements. It is also possible to use other switchgear apparatuses, for example switches, differential switches or relays.

The invention claimed is:

1. Voltage surge protection device comprising at least one protection module connectable to an electric switchgear apparatus, a unit comprising said at least one protection module and said electric switchgear apparatus connectable between a power line and ground, such a power line being connected to a load, said at least one protection module comprising:

at least one protective element connectable to ground for protection against voltage surges, such that when the protective element fails due to a voltage surge, an increase in at least one of temperature and electric current results at said protective element;

separating means connected to said protective element for generating at least one of an electrical and mechanical separation of said protective element from said power line, without disconnecting such a power line from such a load connected to the failed protective element, upon detecting such increase of at least one of temperature and electric current; and means for mechanical actuation connected to said separating means and comprising a mechanical control link, said mechanical control link for being placed in a tripped state when said protective element fails and when said separating means have generated such mechanical or electrical separation, wherein said means for mechanical actuation is connectable to the electric switchgear apparatus by means of the mechanical control link for actuating opening or tripping of said apparatus when said mechanical link is in a tripped state.

2. The voltage surge protection device according to claim 1, wherein the means for mechanical actuation is capable of disabling the mechanical control link when the mechanical control link is in a tripped state caused by separation of said separating means.

3. The voltage surge protection device according to claim 1 wherein the separating means comprise at least one thermal pin, and the at least one protective element is at least a varistor in thermal connection with said thermal pin, said thermal pin being connected to the means for mechanical actuation to place the mechanical control link in a tripped state following melting of said thermal pin caused by heating of said varistor.

4. The voltage surge protection device according to claim 1 wherein the separating means comprise at least one electrical fuse, and the at least one protective element is at least one discharge tube in electrical connection with the electrical fuse of the separating means, said fuse being connected to the means for mechanical actuation to place the mechanical control link in a tripped state following melting of said fuse caused by an increase of the current in said discharge tube.

5. The voltage surge protection device according to claim 4 wherein the separating means comprise at least one thermal pin and at least one fuse, and the means for mechanical actuation comprise centralizing means for receiving a mechanical input from at least one of the thermal pins and fuses of the separating means upon melting of at least one of said thermal pins and fuses, and for actuating the control link in response to such mechanical input.

6. The voltage surge protection device according to claim 1 wherein the means for mechanical actuation comprise:
   at least one lever connected to the separating means and to the mechanical control link, and
   at least one return spring connected to said lever and to a case of the protection module to return said lever to a fault position when an element of the separating means releases the lever following a mechanical separation due to thermal or electrical stresses, said mechanical control link being actuated and kept in a tripped state by the lever when it is in a fault position.

7. The voltage surge protection device according to claim 1 wherein the separating means comprise at least a combination of an electric fuse element and a thermal pin, mechanical separation of the electric fuse element or of the thermal pin being able to cause actuation of the means for mechanical actuation.

8. The voltage surge protection device according to claim 1 wherein the separating means comprise at least one thermal pin made of metal alloy or of thermofusible plastic material, a first arm connected to said thermal pin, and a second arm connected to said first arm, and
   melting or fusing of the pin causes a mechanical separation of the first arm from the thermal pin, such that the first arm causes the second arm to act on the means for mechanical actuation.

9. The voltage surge protection device according to claim 1 wherein the separating means comprise an electric fuse element comprising a metal blade positioned in arc distribution fins.

10. The voltage surge protection device according to claim 1 wherein at the least one protection module comprises mechanical display means for displaying the operating state of the protection device, said display means comprising the mechanical control link.

11. The voltage surge protection device according to claim 1 wherein the at least one protection module comprises mechanical means for displaying the operating state of the protection device actuated by the mechanical control link.

12. The voltage surge protection device according to claim 1 wherein the at least one protection module comprises at least two protective elements and mechanical means for local display actuated by the actuating means to indicate the state of the separating means of the at least two protective elements in differentiated manner.

13. The voltage surge protection device according to claim 1 comprising an electric switchgear apparatus in conjunction with said protection module, said electric switchgear apparatus comprising inputs designed to be connected to a line to be protected, main contacts controlled by a trip mechanism, and outputs, said at least one protective element against voltage surges being connected to the outputs of the switchgear apparatus and the mechanical control link being connected to the trip means to actuate opening and/or to block closing of the main contacts of the electric switchgear apparatus when said mechanical link is in a tripped state representative of a fault of the at least one protective element.

14. The voltage surge protection device according to claim 13 wherein said protection module comprises mechanical means for displaying the operating state of the protection module mechanically linked to an operating handle of the electric switchgear apparatus.

15. The voltage surge protection device according to claim 13 comprising a second protection module comprising second means for mechanical actuation and a second mechanical control link to act on tripping of the switchgear apparatus, the second mechanical link acting on the trip mechanism of the switchgear apparatus via a first mechanical link of a first protection module.

16. The voltage surge protection device according to claim 15 wherein the electric switchgear apparatus is a four-pole switchgear apparatus, outputs of a first and second pole receiving connection of protective elements of said first protection module and outputs of a third and fourth pole receiving connection of protective elements of said second additional protection module.

17. The voltage surge protection device according to claim 13 comprising an auxiliary electric device associated with said protection module to receive actions or to actuate a mechanical tripping link.

18. The voltage surge protection device according to claim 13 wherein the switchgear apparatus and the protection modules are modular and coupled via a lateral side.

19. The voltage surge protection device according to claim 13 wherein the switchgear apparatus is a molded case circuit breaker and the protection module is mounted on output terminals down-line from said circuit breaker, said trip means designed to receive an action from the mechanical link being situated on a down-line side of said circuit breaker.

* * * * *